(12) United States Patent
George et al.

(10) Patent No.: US 10,175,444 B2
(45) Date of Patent: Jan. 8, 2019

(54) INSTALLATION OF OPTICAL FIBER BUNDLES IN A MULTI-DWELLING UNIT FOR PROVIDING NETWORK ACCESS TO MULTIPLE USER PREMISES

(71) Applicant: OFS Fitel, LLC, Norcross, GA (US)

(72) Inventors: John E George, Cumming, GA (US); Daniel Hendrickson, Roswell, GA (US)

(73) Assignee: OFS FITEL, LLC, Norcross, GA (US)

(*) Notice: Subject to any disclaimer, the term of this patent is extended or adjusted under 35 U.S.C. 154(b) by 205 days.

(21) Appl. No.: 14/783,891

(22) PCT Filed: Apr. 14, 2014

(86) PCT No.: PCT/US2014/034028
§ 371 (c)(1),
(2) Date: Oct. 12, 2015

(87) PCT Pub. No.: WO2014/172285
PCT Pub. Date: Oct. 23, 2014

(65) Prior Publication Data
US 2016/0097911 A1 Apr. 7, 2016

Related U.S. Application Data

(60) Provisional application No. 61/811,999, filed on Apr. 15, 2013.

(51) Int. Cl.
*H01R 43/00* (2006.01)
*G02B 6/46* (2006.01)
(Continued)

(52) U.S. Cl.
CPC .............. *G02B 6/46* (2013.01); *G02B 6/245* (2013.01); *G02B 6/255* (2013.01); *G02B 6/4472* (2013.01);
(Continued)

(58) Field of Classification Search
CPC ...... G02B 6/245; G02B 6/255; G02B 6/4446; G02B 6/4472; G02B 6/4478;
(Continued)

(56) References Cited

U.S. PATENT DOCUMENTS 7,720,338 B2 * 5/2010 Graveston ............ G02B 6/4432
385/100
9,632,267 B1 * 4/2017 Burek .................. G02B 6/4442
(Continued)

FOREIGN PATENT DOCUMENTS

JP      2007304550 A     11/2007
JP      2010-527463      8/2010
(Continued)

OTHER PUBLICATIONS

3M, "One Pass Fiber Pathway Installation Instructions" (Nov. 2011), at pp. 5, 57-59, 65, 87, 95-97, 99-101,109, 111, 115, 119.
(Continued)

*Primary Examiner* — Paul D Kim
(74) *Attorney, Agent, or Firm* — Law Offices of Leo Zucker (57) ABSTRACT

A method of installing a bundle of optical fibers associated with a fiber network through hallways or corridors in a multi-dwelling unit (MDU) to service a number of premises in the MDU. The bundle is adhered along a wall or other supporting surface in a hall or corridor leading to the premises, by dispensing or activating an adhesive material or component over one or both of the bundle and a desired installation path along the supporting surface, and applying the bundle to the supporting surface over the installation path. A cover layer surrounding the fiber bundle is opened at locations along the length of the bundle corresponding to each premises for which a bundle fiber is designated. At each location, the designated fiber is cut and removed from the
(Continued)

bundle, and retained to connect to a drop fiber originating from the premises. Installation tools are also disclosed.

9 Claims, 9 Drawing Sheets

(51) Int. Cl.
    *G02B 6/245*      (2006.01)
    *G02B 6/255*      (2006.01)
    *G02B 6/44*      (2006.01)
    *H02G 1/12*      (2006.01)
    *H02G 3/30*      (2006.01)

(52) U.S. Cl.
    CPC ......... *G02B 6/4478* (2013.01); *G02B 6/4495* (2013.01); *G02B 6/4497* (2013.01); *G02B 6/4446* (2013.01); *G02B 6/4466* (2013.01); *H02G 1/1204* (2013.01); *H02G 3/305* (2013.01)

(58) Field of Classification Search
    CPC ...... G02B 6/4495; G02B 6/4497; G02B 6/46; G02B 6/4466; H02G 1/1204; H02G 3/305
    See application file for complete search history.

(56) References Cited

U.S. PATENT DOCUMENTS

| | | |
|---|---|---|
| 2009/0324188 A1 | 12/2009 | Berglund et al. |
| 2011/0113633 A1 | 5/2011 | Daggett et al. |
| 2011/0211794 A1 | 9/2011 | Ruzzler et al. |
| 2012/0137510 A1 | 6/2012 | Thompson et al. |
| 2013/0020015 A1 | 1/2013 | Dickinson et al. |
| 2015/0355428 A1* | 12/2015 | Leeman ............ G02B 6/4455 385/135 |

FOREIGN PATENT DOCUMENTS

| | | |
|---|---|---|
| JP | 2012029554 A | 2/2012 |
| WO | WO 2012/012357 A1 | 1/2012 |
| WO | WO 2012/012362 A2 | 1/2012 |

OTHER PUBLICATIONS

3M, One Pass Fiber Pathway—Installation Instructions (Nov. 2011).
3M, One Pass Fiber Pathway—Frequently Asked Questions (2011).
L. M. Wilkes, et al., Overcoming the Challenges of Fiber Deployment in Multiple Dwelling Units, 3M Communication Markets Div. (2012).

* cited by examiner

INSTALLATION OF OPTICAL FIBER BUNDLES IN A MULTI-DWELLING UNIT FOR PROVIDING NETWORK ACCESS TO MULTIPLE USER PREMISES

CROSS REFERENCE TO RELATED APPLICATION

This application claims priority under 35 U.S.C. § 119(e) of U.S. Provisional Patent Application No. 61/811,999 filed Apr. 15, 2013, titled "Multidwelling Unit (MDU) Multifiber Solution and Tool" which is incorporated by reference in its entirety.

BACKGROUND OF THE INVENTION

Field of the Invention

The present invention concerns a method of installing bundles of optical fibers in a multi-dwelling unit or building to provide network access for a number of premises in the building, and tools for performing the installation.

Discussion of the Known Art

To provide fiber optic network service to subscribers or users who occupy a number of premises inside a multi-dwelling unit (MDU) such as an apartment or office building, bundles or tubes containing optical fibers are typically installed along the walls of hallways or corridors leading to the various premises. One or more fibers are designated for servicing a particular living unit or premises in the MDU. Such fiber bundles are commercially available from, e.g., OFS Fitel, LLC, under the registered trademark EZ-Bend®.

At or near an entrance to each premises, a fiber (or fibers) designated for the premises is removed from the bundle, and an end length of the fiber is retained or stored in an interconnect box or adapter mounted nearby. A drop fiber is routed from inside the premises to the box or adapter where it is connected to the corresponding designated fiber from the bundle, thus allowing users inside the premises to access the network through the drop fiber.

So-called "pullback" solutions are known with respect to solid-walled tubes that contain loose floating fibers that are either tight buffered (e.g., 900 µm OD), or bare. The tubes are installed along a hallway wall, and a designated fiber is accessed by forming two small openings a certain length apart in the tube wall. The designated fiber is identified and pulled slightly out of one opening and cut. The fiber is then pulled completely out of the second opening, causing the cut end of the fiber to be pulled back inside the tube from the first opening as the fiber is pulled out of the second opening. The end length of the fiber is then stored in an interconnect box mounted near the second opening in the tube, for connection to the drop fiber from the premises.

Alternate solutions include the bundling of buffered optical fibers each with an OD of from 900 µm to 3.0 mm, into cables (or "cords") by the use of a light cable binder (e.g., an aramid or polyester yarn), or by covering the fibers with a polymer outer jacket. The binder or outer jacket is removed at a first location to expose a desired fiber, and the fiber is cut. The installer then moves several feet along the bundle to a second location, and opens the binder or outer jacket holding the fibers together. A designated fiber is pulled out of the bundle at the second location, and the cut end length of the fiber is stored for connection with a drop fiber.

An MDU fiber installation solution offered by 3M™ Company under the name "One Pass Pathways" includes a PVC duct or tube containing multiple fibers, wherein the duct has an adhesive backing. To install the duct along a wall, the adhesive backing is exposed by peeling off a protective strip from the backing on the duct as the duct is being unwound from a reel and applied to the wall.

The known methods of installing bundles or tubes of optical fibers along hallways in MDUs usually require large and expensive moldings to be placed over the installed bundles to keep them hidden from view. Otherwise, the bundles can present an unsightly appearance. Another problem stems from the fact that most hallway walls are not flat or smooth over their entire length, e.g., building supports and other structural or decorative objects often cause the wall to protrude at various locations, thus requiring the fiber bundles to conform with sharp corners or bends over their installation span. Even if the bundle contains bend insensitive fibers, an outside jacket or cover on the bundle may be unable to lie flush against the wall at such locations without damage.

So-called blown fiber optic cables having a low friction outer jacket are offered by AFL Telecommunications under the registered mark MicroCore®. According to the company, a 12-fiber version of the cable has an OD of only 1.6 mm, but the minimum allowable bend radius for the cable is 32 mm.

A high density and flexible optical fiber cable is available from OFS Fitel, LLC, under the registered trademark Accu Pack®. See U.S. Pat. No. 7,720,338 (May 18, 2010) which is incorporated by reference. Up to twelve color coded, 250 micron bend-insensitive optical fibers are contained in a round dual layer buffer encasement having an OD of only about 1.4 mm, and an allowable bend radius as small as 5 mm. As sold, Accu Pack cables also have a round outer jacket with an OD of about 4.8 mm, and a yarn reinforcement layer between the jacket and the encased fibers.

Tools capable of opening an optical fiber cable in the form of a flat ribbon of parallel fibers and a surrounding sheath are also known. See, e.g., U.S. Pat. No. 6,909,832 (Jun. 21, 2005). The tools are not constructed for opening a flat ribbon cable midspan to gain access to the sheathed fibers, however. The mentioned "One Pass Pathways" system of 3M does include a so-called "window cut" template (3M prod. # WC-TEMP-20) in the form of an elongated rectangular plate having an axial slot, and an associated cutting tool (# WC-TOOL-50) that resembles a potato "peeler." According to the 3M procedure, after the PVC duct is installed, it can be entered midspan to access a desired fiber by urging the template lengthwise over the duct until the duct covering protrudes through the slot in the template. The cutting tool is then used to peel away the protruding cover material and expose the fibers for access. Other tools from Miller® (# MSAT 5) and Uraseal® (# ACFO 6278) work to open an uninstalled fiber bundle by aligning the bundle in a guide channel, and then pulling the bundle past a blade in the channel to cut the bundle open and expose the fibers, according to the tool vendors.

Patent Application Pubs. No. US 2012/0020635 (Jan. 26, 2012), No. US 2012/0138214 (Jun. 7, 2012), and No. 2012/0066987, all of which are incorporated by reference, disclose procedures and tools for installing a single fiber inside a premises by applying an adhesive component or substance about the fiber and onto an adjacent supporting surface. The publications are not directed to the installation of a bundle of fibers along a hallway in a MDU wherein the bundle is opened midspan so that a fiber can be removed and retained for connection to a drop fiber from the designated premises, however.

In view of the above, there is a need for a method or procedure including tools that will reduce the time and cost for installing optical fiber bundles along walls or other supporting surfaces in halls or corridors of a MDU, and for accessing a fiber midspan of the bundle so that the fiber can be cut and an end length of the fiber retained near the premises for which the fiber is designated. There is also a need for such a procedure wherein the finished installation can present a more pleasing visual appearance than existing fiber bundle installations.

SUMMARY OF THE INVENTION

According to the invention, a method of installing a bundle of optical fibers associated with a fiber network through hallways or corridors in a multi-dwelling unit (MDU) to service a number of premises in the MDU, includes adhering the bundle along a wall or other supporting surface in a common hallway or corridor leading to the premises by dispensing or activating an adhesive material or component over one or both of the bundle and a desired installation path along the supporting surface, and applying the bundle to the supporting surface over the installation path. A cover layer that surrounds the fiber bundle is opened at locations along the length of the bundle which locations correspond to the premises for which the bundle fibers are designated. At each location, a fiber designated for the corresponding premises is cut and removed from the bundle, and the fiber is retained to connect to a corresponding drop fiber that originates from inside the premises.

For a better understanding of the invention, reference is made to the following description taken in conjunction with the accompanying drawing and the appended claims.

BRIEF DESCRIPTION OF THE DRAWING FIGURES

In the drawing:

FIGS. 11(*a*) to 11(*f*) illustrate a second embodiment of the inventive fiber bundle installation process;

DETAILED DESCRIPTION OF THE INVENTION

The present invention relates to a method of installing one or more bundles of optical fibers in a multi-dwelling unit (MDU) or building, so that access to an outside fiber optic network can be provided to users occupying a number of premises throughout the building. Inventive tools for carrying out the installation process are also described.

Figure 1:
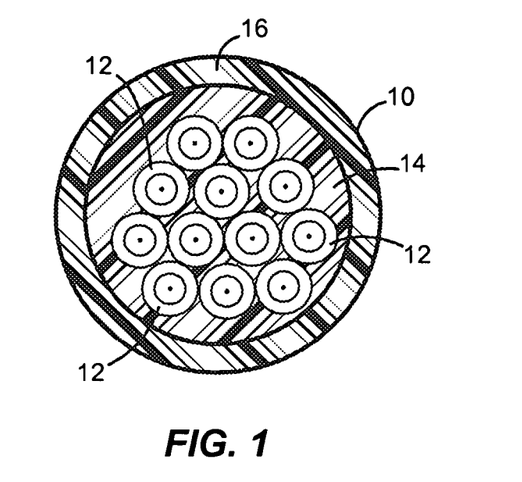
FIG. 1 is a cross sectional profile of an optical fiber bundle according to the invention.

FIG. 1 shows a cross section through a fiber bundle 10 that is a part of the earlier mentioned Accu Pack cable. The bundle 10 contains, for example, twelve bend insensitive optical fibers 12 each having an OD of 250 μm. The fibers are encased and embedded in a soft acrylate matrix 14 that is surrounded by a relatively hard acrylate encasement layer 16 having an OD of about 1.4 mm.

As disclosed in the earlier mentioned U.S. Pat. No. 7,720,338, the dual layer acrylate encasement of the optical fibers 12, namely, the soft inner matrix 14 and the harder encasement layer 16, isolate the fibers 12 from any bending or crushing force that could otherwise damage or harm the fibers. As mentioned, the fiber bundle 10 may assume a bend radius as small as 5 mm without impairing the signal transmission characteristics of the fibers 12.

The inner matrix 14 and the encasement layer 16 of the fiber bundle 10 are preferably UV-curable acrylates, although other polymers can be substituted. The fibers 12 may be color coded so they can be easily identified among one another, and removed from the bundle 10 for storage and termination near the premises for which the fibers are designated, as explained below.

Figure 2:
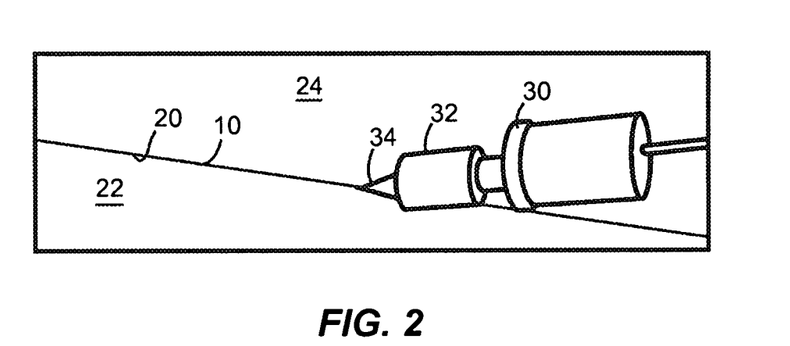
FIG. 2 shows an installation of the fiber bundle in FIG. 1 along a corner formed by a hallway wall and ceiling in a multidwelling unit (MDU), according to the invention.

FIG. 2 shows a length of the fiber bundle 10 in FIG. 1 being applied along an inside corner 20 formed by a wall 22 and a ceiling 24 in a hallway of a multidwelling unit (MDU), according to the invention. The bundle 10 may be installed by applying or activating an adhesive substance or component on the outside surface of the bundle, and pressing the bundle into the corner 20, and/or against the wall 22 or other supporting surface over a span that includes locations at or near the premises for which the bundle fibers 12 are designated.

In FIG. 2, the bundle 10 is installed by the use of a tool 30 that may be similar to the tool disclosed in connection with FIG. 1 of the earlier referenced Pub. No. US 2012/0020635. For example, the tool 30 may be in the form of a mechanical or electrically powered gun for dispensing an adhesive caulking. In one embodiment, the tool 30 is constructed and arranged to operate with a replaceable cartridge 32 that contains a caulking or adhesive substance that is applied through an applicator tip 34 in the form of a bead over a desired route for the bundle 10 along the hallway wall 22, including bend managers 44, 46 (see FIG. 3) that have been installed at sharp corners of the route to preserve a minimum bend radius for the bundle. The adhesive bead may be applied by the tool 30 in successive lengths of, e.g., 1-2 meters each, over the desired route so that before the bead hardens, the fiber bundle 10 can be pressed manually into the bead by an installer's finger or a wooden stick.

Alternatively, the outside surface of the bundle 10 may be precoated with a dried adhesive component, and the cartridge 32 may contain an agent for activating the adhesive component as the bundle 10 is guided against a supporting surface. It is preferable that any adhesive applied or activated on the surface of the bundle 10 be such as to dry or become non-tacky as quickly as possible, and to bond the bundle 10 firmly on the supporting surface. See the earlier mentioned Pub. No. US 2012/0066987 which is incorporated by reference.

Figure 3:
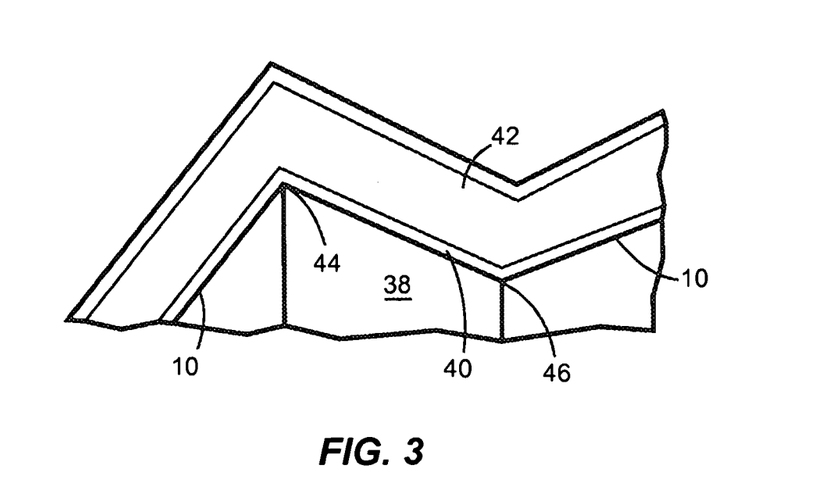
FIG. 3 shows an installation of the fiber bundle in FIG. 1 along an edge of a crown molding with right angle corners, according to the invention.

FIG. 3 shows a length of the fiber bundle 10 installed along a hallway wall 38 below a bottom edge 40 of a crown molding 42, including the use of the corner bend managers 44, 46 according to the invention. The bend managers 44, 46 may be the same or similar to the outside and the inside corner bend managers disclosed in connection with FIGS. 10 and 11 of the earlier referenced Pub. No. US 2012/0138214.

Bend managers 44, 46 should be used when installing the fiber bundle 10 over right angle or sharp wall corners which are often present in the hallways of MDUs, to ensure the bundle 10 is not stressed below a specified minimum radius of curvature at the corners. The bend managers 44, 46 may, for example, have a self-adhesive backing so they can be fixed easily and quickly on the wall corners before the tool 30 is used to apply an adhesive bead on the bend managers and the bundle 10 is routed over them. The bend managers 44, 46 may also be used to retain a length of the fiber bundle 10 in place between the bend managers over a desired route, to facilitate the installation procedure of adhering the length of the bundle onto the wall surface.

Figure 4A:
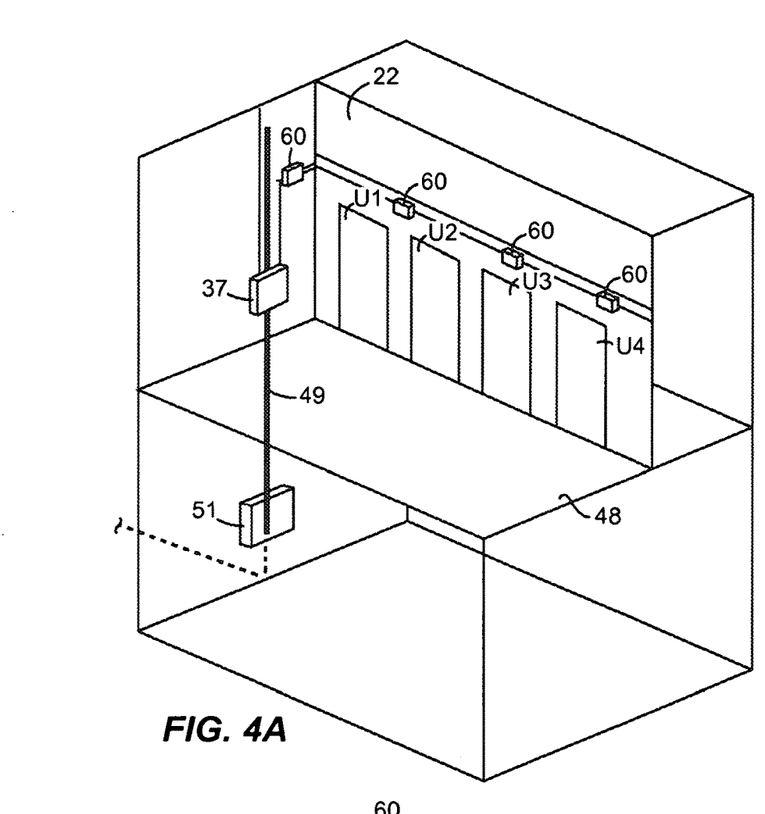
FIGS. 4A and 4B together illustrate a plan for the installation of the fiber bundle along a hallway for servicing multiple premises on a floor of the MDU.
Figure 4B:
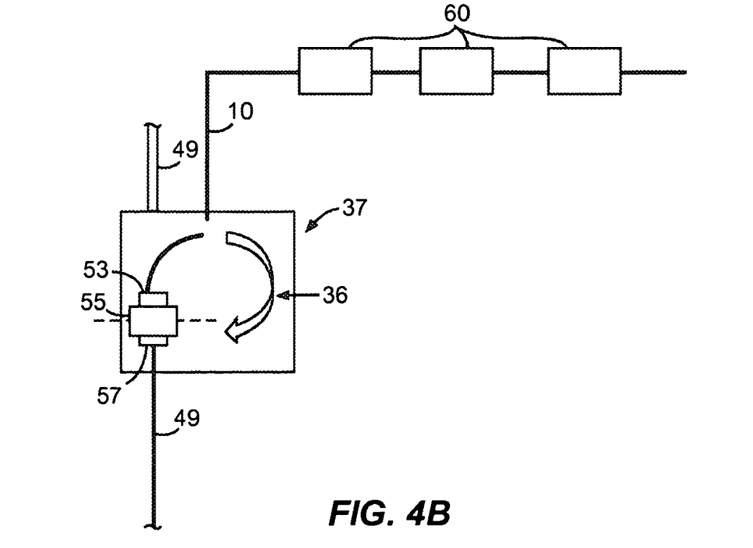
Figure 5:
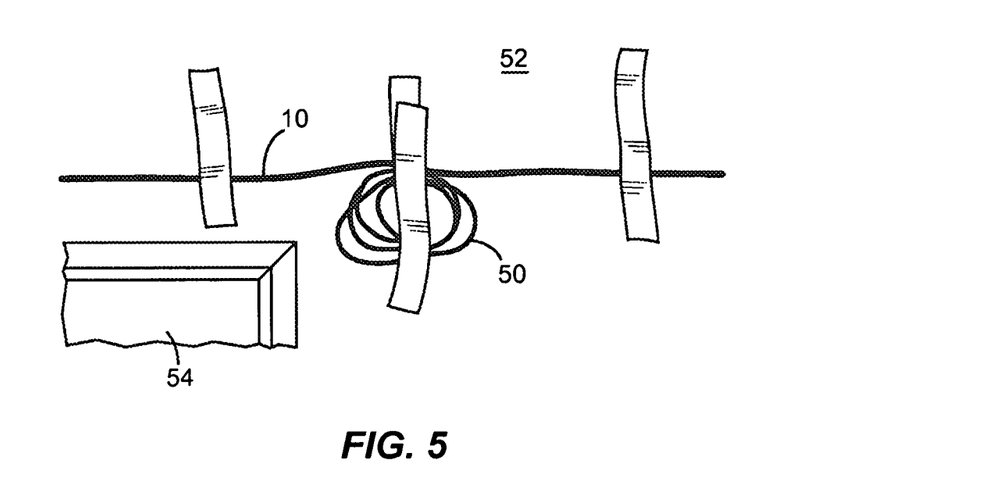
FIG. 5 shows a slack coil of the fiber bundle retained on a wall near a premises to be served in the MDU, according to a first embodiment of the inventive process.

FIGS. 4A and 4B together illustrate an installation of the fiber bundle 10 along a hallway 48 on a given floor of a MDU, for serving a number of individual user premises U1 to U4 situated on the floor, according to the invention. A supply of the fiber bundle 10 of, for example 100 to 200 feet in length, is wound on a supply reel or spool 36 (see FIG. 4B). A storage box 37 is mounted at the left end of the hallway 48 as viewed in FIG. 4A, near a riser cable 49 that originates from a fiber network entrance box 51 on a lower level of the MDU. The end of the fiber bundle 10 that is free to unwind from the spool 36 is left unterminated, and an opposite or inside end of the wound bundle may be terminated in either a multifiber (e.g., type MPO connector 53) or a number of single fiber connectors. Alternatively, the opposite end of the wound bundle can be left unterminated so the bundle fibers can be fusion or mechanically spliced to network fibers associated with the riser cable 49. See FIG. 4B.

A connector adapter 55 is mounted on the storage box 37. As represented in FIG. 4B, the adapter 55 is configured to connect at one end with a mating connector 57 on the riser cable 49 outside of the box 37, and to connect at the other end of the adapter with the multifiber connector 53 on the inside end of the fiber bundle 10 when the bundle is placed inside the box 37.

Specifically, in one installation procedure according to the invention, the supply spool 36 is initially mounted on the applicator tool 30, and the bundle 10 unwinds as it is applied by the applicator tip 34 against the wall 22 beginning at or near the farthest premises U4 down the hallway 48 from the storage box 37, continuing past the premises U3, U2, and U1, and ending at the storage box 37 as shown in FIGS. 4A and 4B. The applicator tip 34 is preferably formed so that the adhesive, whether precoated on the bundle 10 or supplied by the applicator tool 30, will flow about the fiber bundle 10 to adhere the bundle to the wall 22 while the tip 34 provides strain relief for the bundle 10 at the same time.

The tool cartridge 32 may contain and dispense, for example, a commercially available silicone or acrylic based caulking. Further, if it is desired to recess a length of the bundle 10 beneath a wall surface, the tool 30 may include a cutting blade at the distal end for forming a narrow channel in the surface, in situ. This would allow the tool 30 to lay the bundle 10 in the formed channel before depositing or activating the adhesive over the bundle.

After the bundle 10 is installed along the wall 22 between the premises U4 and the storage box 37, any length of the bundle 10 that remains wound on the supply spool 36 is placed with the spool inside the storage box 37, and the inside end of the bundle 10 terminated in the multifiber connector 53 is connected to the adapter 55 inside the box 37. If desired, the spool 36 may be constructed to be separated from any remaining unwound length of the bundle 10 so that the spool itself can be discarded.

In an alternative installation procedure according to the invention, a desired path for the span of the fiber bundle 10 between the storage box 37 and the premises U4 farthest from the box, is identified by marking or otherwise on the wall 22. The length of the path is measured, and a corresponding length of the fiber bundle 10 is unwound from the supply spool 36. As mentioned earlier, the tool 30 may be constructed and used to deposit a bead of an adhesive compound over successive lengths (e.g., 1-2 meters each) of the path marked on the wall and over any bend managers 44, 46 installed along the path. The installer then presses a corresponding length of the unwound bundle 10 into each adhesive bead after the bead is deposited over the path. As in the first procedure described above, any remaining or unwound length of the bundle 10 is placed inside the storage box 37, with or without the spool 36, and the terminated end of the bundle is connected to the adapter 55 inside the box 37.

The fiber bundle 10 is entered or opened midspan at locations along the bundle that correspond to each of the premises U1 to U4 to be served by a designated fiber 12. At each location, the encasement or covering layer 16 is cut or stripped over a determined length (e.g., 3 to 4 feet), and the relatively soft acrylic matrix 14 is easily removed by hand to expose the bundle fibers 12. The bundle 10 may entered or opened midspan either before or after it is adhered to a wall during the installation. At each opening, the fiber or fibers 12 designated for the corresponding premises is cut, an end length of the fiber is removed from the bundle 10, and the end length is retained or stored at or near the premises for connection to a corresponding drop fiber from inside the premises.

Figure 6:
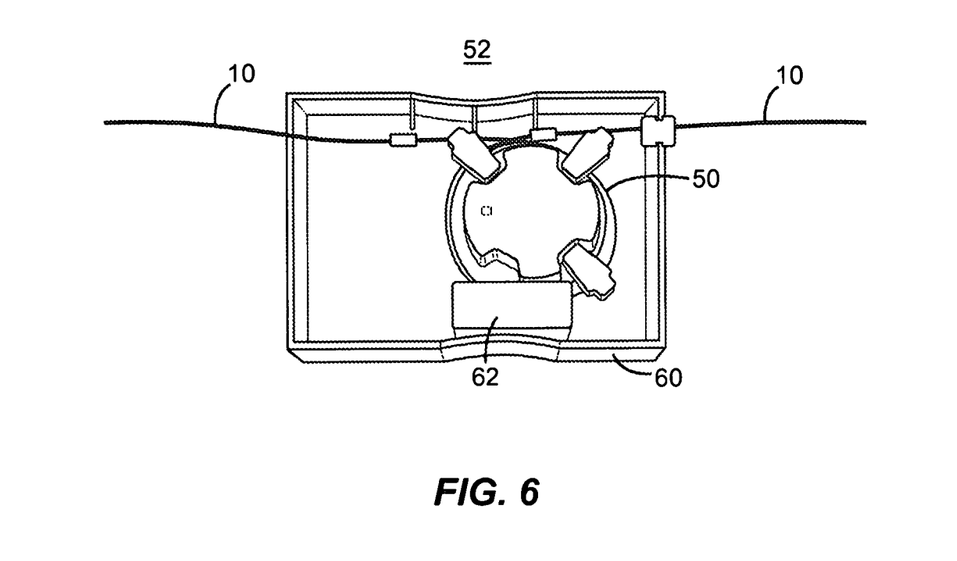
FIG. 6 shows the slack coil in FIG. 5 after a cover layer on the fiber bundle in FIG. 1 is opened, and the coil is retained or stored in an interconnect box or enclosure mounted on a wall.

FIGS. 5 to 10 show further details of the inventive installation process. As the bundle 10 is routed past each premises to be served, a certain length of the bundle 10 is coiled by hand to form a slack coil 50. The coil 50 is retained near an entry point of the premises, e.g., by taping the coil 50 on a wall 52 (or the wall 22 in FIGS. 4A and 4B) above an entrance door 54 to the premises. The encasement and matrix layers 14, 16 of the coiled bundle 10 are opened and removed as described above. A cutting device such as a tool 100 described below in connection with FIGS. 12 and 13 may be used to cut the encasement layer 16 open. The slack coil 50 is then transferred into an interconnect module or box 60 mounted on the wall 52 (or the wall 22 as shown in FIG. 4A) for storage next to the premises as shown in FIG. 6. The box 60 may also be supplied with an optical fiber connector adapter 62 for later use, as explained below.

Figure 7:
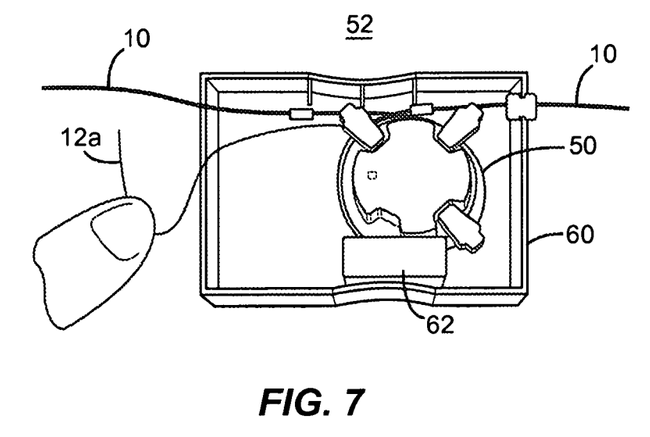
FIG. 7 illustrates cutting and removal of an end length of a designated fiber from the stored slack coil in FIG. 6.
Figure 8:
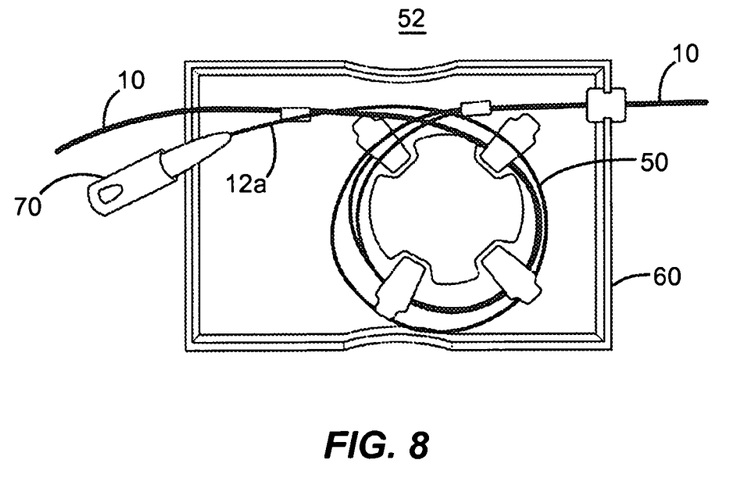
FIG. 8 shows the end length of the designated fiber in FIG. 7 connected to an optical connector.

As illustrated in FIG. 7, to connect a drop fiber that originates from inside a subscriber's premises to a bundle fiber 12a designated for the premises, the fiber 12a is identified (e.g., by color) and exposed on one of the turns of the slack coil 50 stored in the box 60. The fiber 12a is cut, and an end length of the fiber 12a including the cut end of the fiber is withdrawn from the coiled bundle as shown at the left in FIG. 7. A fusion splice-on or mechanical splice connector 70 is connected to the cut end of the fiber 12a as shown in FIG. 8, or the cut end may be left in place to be fusion spliced to the drop fiber originating from inside the premises.

Figure 9:
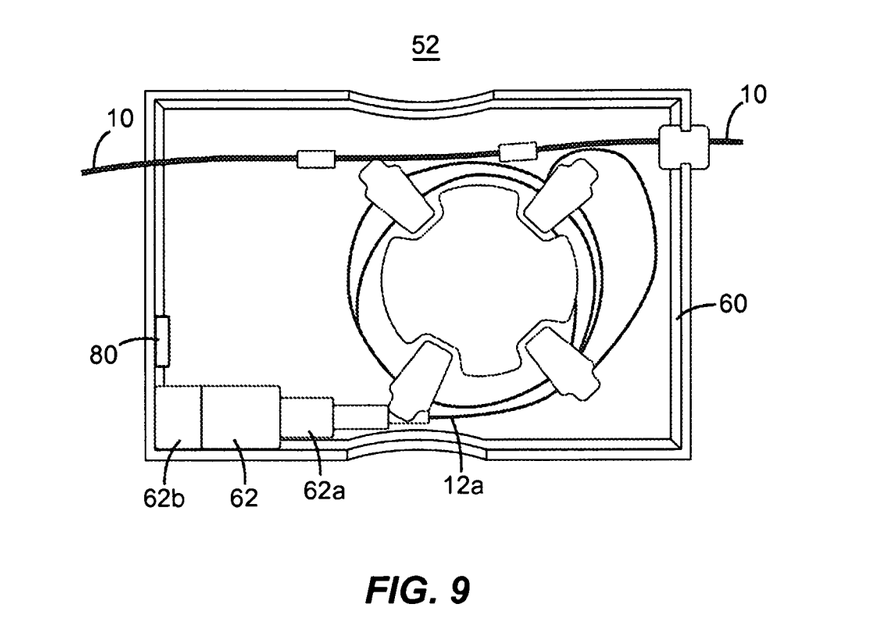
FIG. 9 shows the optical connector in FIG. 8 connected to an adapter mounted on the interconnect box.
Figure 10:
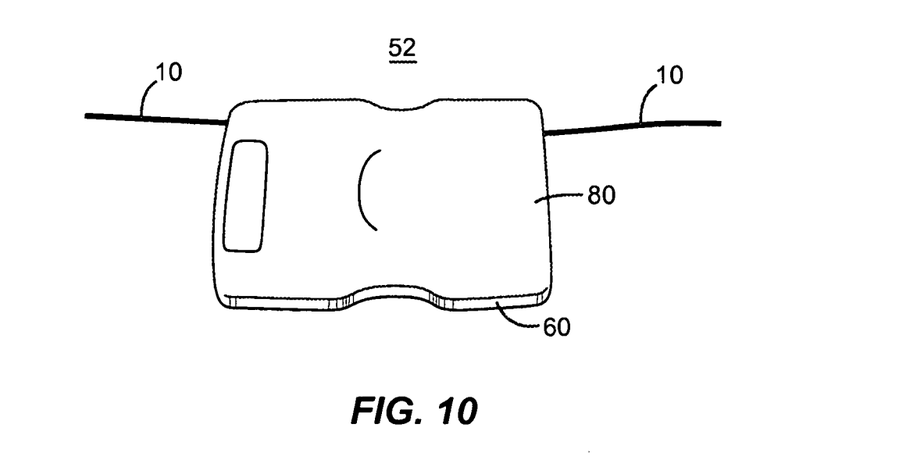
FIG. 10 shows the interconnect box in FIG. 9 with a box cover set in place.

As shown in FIG. 9, if the connector 70 is fastened to the cut end of the bundle fiber 12a, then the connector is inserted into one end 62a of the adapter 62. The adapter 62 is snapped or otherwise set in place inside the box 60 so that the opposite end 62b of the adapter is exposed on a sidewall 80 of the box 60 to connect with a mating connector on the drop fiber. A cover 80 is constructed to fit over the box 60 to store the slack coil 50, the removed bundle fiber 12a, and connector components 62, 70 safely inside the box, as shown in FIG. 10.

FIGS. 11(a) to 11(f) illustrate a variation of the inventive installation process that does not require the retaining or storage of a slack coil of the bundle 10 at or near each user premises.

Figure 11:
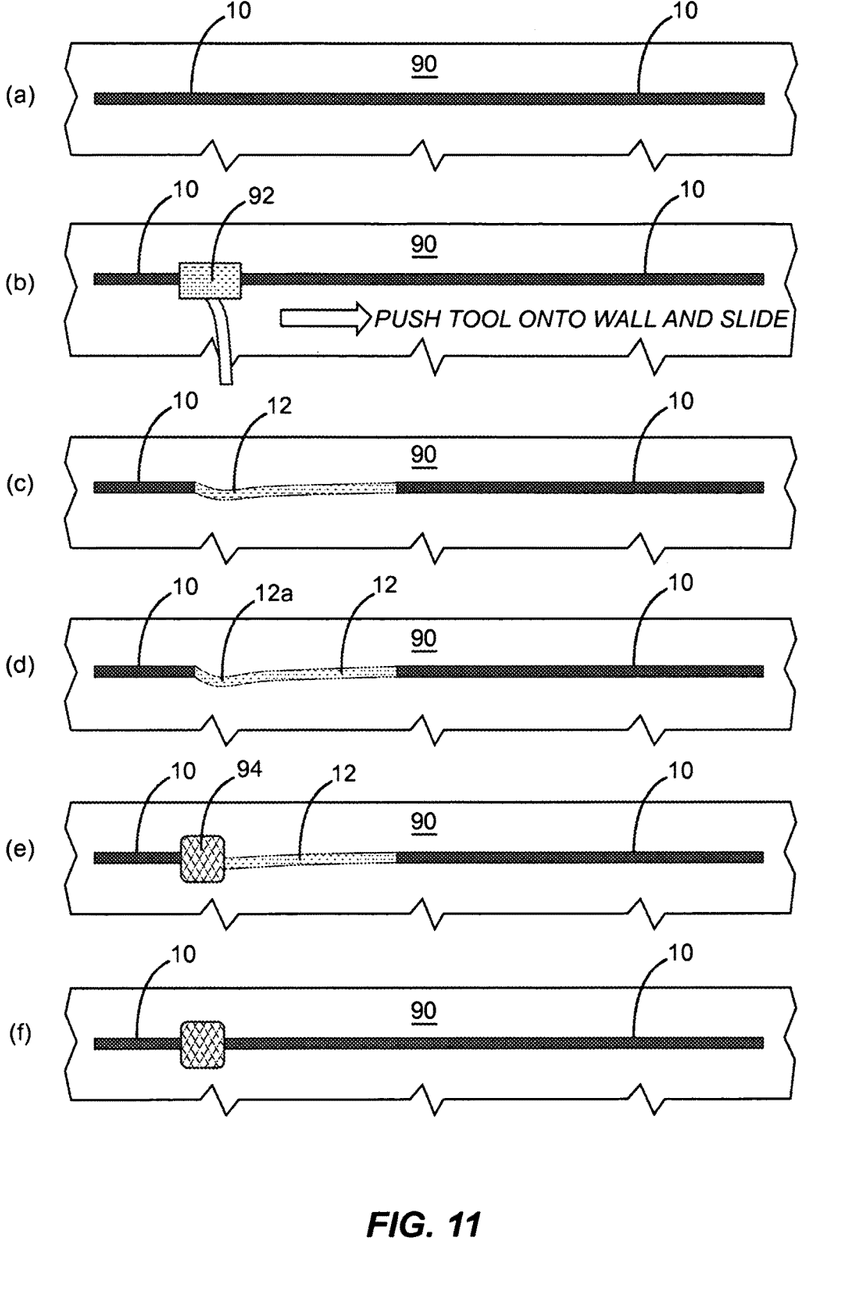

In FIG. 11(a), the fiber bundle 10 is adhered to the surface of a wall 90 using a dispensed adhesive or glue substance as described with respect to FIGS. 2 and 3, over a path that extends past each premises to be served by a fiber 12 in the bundle. As shown in FIG. 11(b), a tool 92 described below in connection with FIGS. 14 to 17 is used to open or strip the encasement layer 16 from the bundle 10. The tool 92 is placed over the installed bundle 10 in the vicinity of the premises, and is slid along a length L of the bundle while being urged toward the wall 90. The matrix layer 14 is then easily removed to expose the bundle fibers 12 for access. See FIG. 11(c).

In FIG. 11(d), the fiber 12a which is designated for the premises is cut and removed from among the exposed fibers 12. An interconnect module or box 94, which may be the same or similar in construction to the box 60 in FIGS. 6 to 10, is mounted on the wall 90. In FIG. 11(e), the cut end of the fiber 12a is terminated and stored in the box 94, and the box is covered. The remaining fibers 12 that are exposed 92 over the length L of the bundle are covered using, for example, a tape or sealant that is color matched to surrounding surface. See FIG. 11(f).

Figure 12:
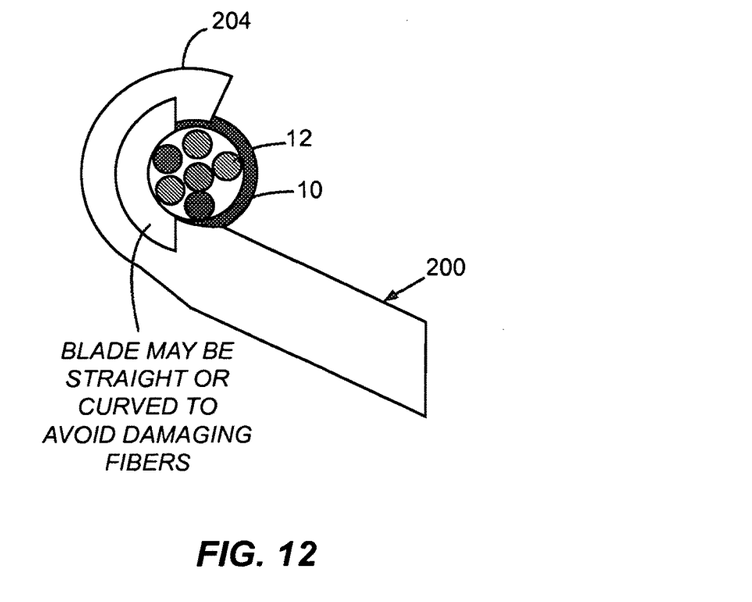
FIGS. 12 and 13 are side and front views of a tool for opening an encasement layer on the fiber bundle in FIG. 1, according to the invention.
Figure 13:
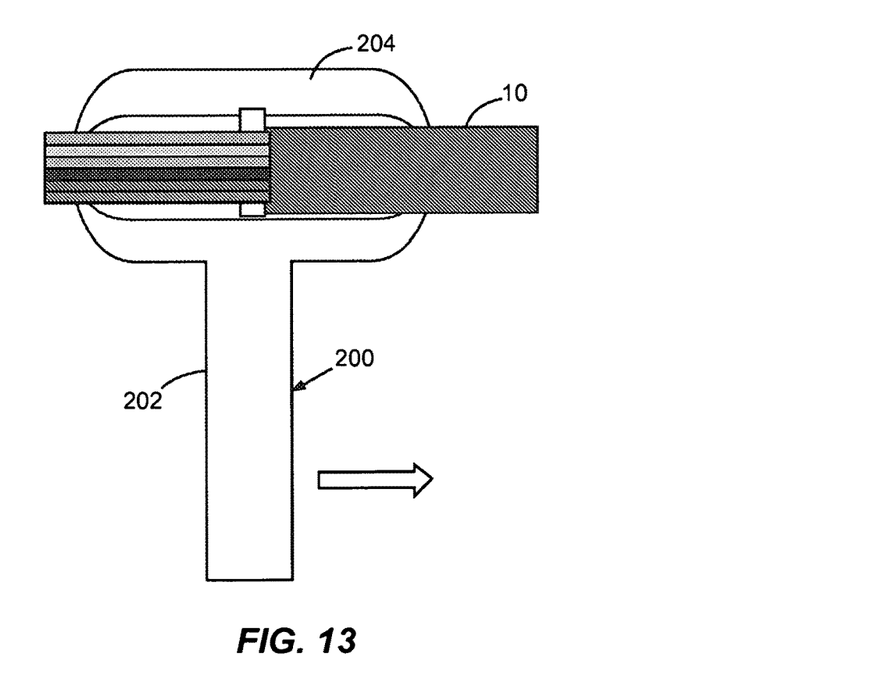

FIGS. 12 and 13 are side and front views of a tool 200 for opening or stripping the encasement layer 16 over a length of the fiber bundle 10 that has not yet been adhered to a wall or other surface. For example, the tool 200 can be used to open the encasement layer 16 over several feet so as to allow the exposed fibers 12 to be wound into the slack coil 50 in FIGS. 5 and 6.

The tool 200 is generally "T" shaped with a tool handle 202, and an elongated cutting head 204 that forms the top of the "T" and has a generally "C" shaped profile as shown in FIG. 12. The cutting head 204 forms an inner passage over the length of the cutting head, and the inner passage opens into a slot on the side of the head that is dimensioned so that the fiber bundle 10 can be pressed sideways into the slot by an installer's thumb. When inserted into the slot, the outer encasement layer 16 on the bundle is urged against an edge of a blade 206 that is fixed inside the tool head 204, and/or into contact with sharp edges 208a, 208b formed about one or both opposite end openings of the inner passage in the cutting head 204.

By holding the bundle 10 with one hand, and then pulling the tool 200 by the handle 202 along the length of the bundle 10 with the other hand, the encasement layer 16 is opened or stripped away. The softer acrylate matrix 14 beneath the layer 16 is then easily removed from the fibers 12 by hand.

FIGS. 14 to 17 show another tool 92 for opening the encasement layer 16 of the fiber bundle 10 after the bundle has been bonded to a wall surface according to the procedure illustrated in FIGS. 11(a) to 11(c).

Figure 14:
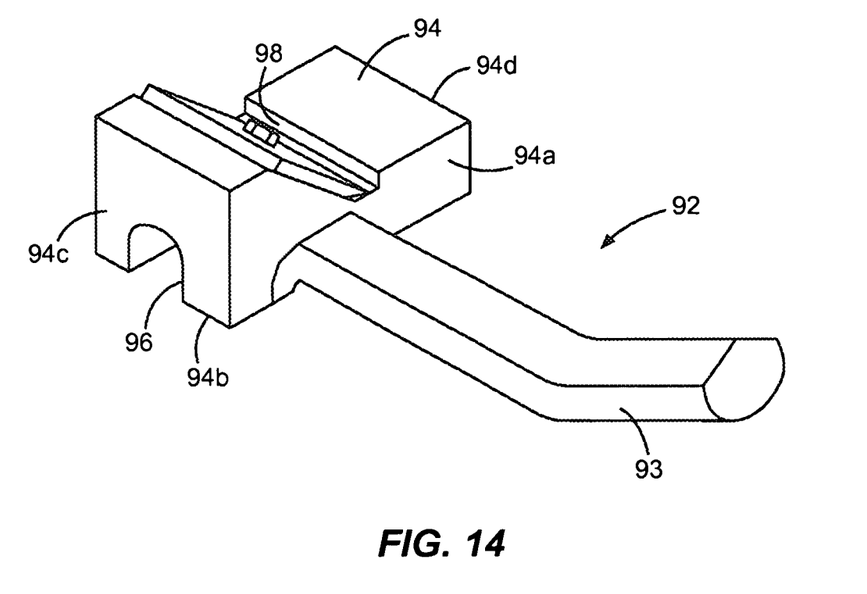
FIGS. 14 to 17 are views of another tool for opening the encasement of the fiber bundle, according to the invention.

As seen in FIG. 14, the tool 92 includes an elongated handle 93, and a generally rectangular tool block 94 with a side wall 94a to which one end of the handle is attached. The handle 93 is contoured so that an installer can maintain a firm grip on the handle while he or she urges a bottom face 94b of the tool block 94 over the bundle 10 and along the wall 90 to expose the fibers 12 for access. See FIG. 11(b). The inclination of the handle 93 with respect to the side wall 94a of the tool block 94 may be offset from the normal so that the installer can use the tool 92 comfortably over an installed fiber bundle. The tool block 94 is described below with respect to FIGS. 15 to 17.

Tool block 94 has a recessed guide slot 96 formed in the bottom face 94b of the block. The guide slot 96 extends over the length of the block 94 and opens on opposite end walls 94c and 94d of the block. The depth of the slot 96 is sufficient to contain the installed bundle 10 in FIG. 11(b) when the installer urges the bottom face 94b of the tool block 94 over the bundle. The edges of the end walls 94c, 94d at the openings of the guide slot 96 are preferably smoothed or chamfered to avoid damaging the bundle 10 as the tool block 94 slides over the bundle during use.

Figure 15:
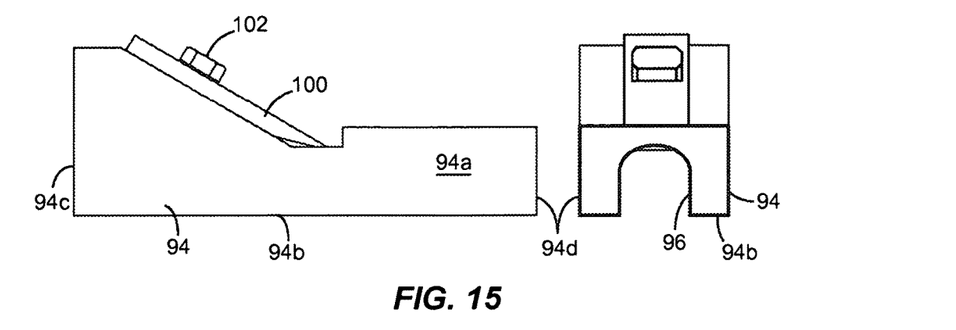
Figure 16:
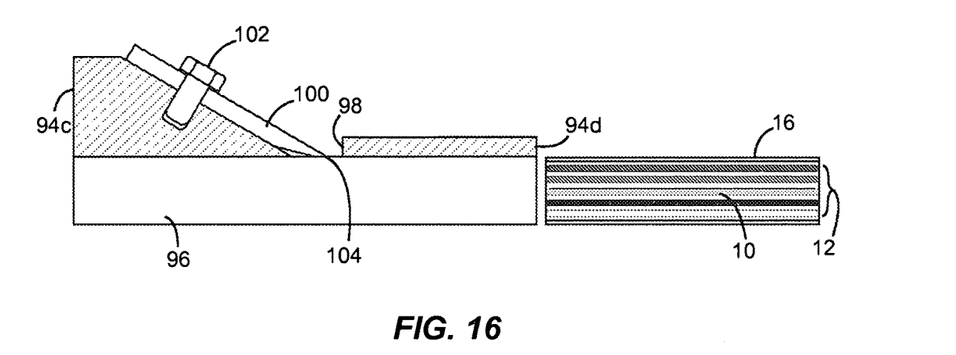
Figure 17:
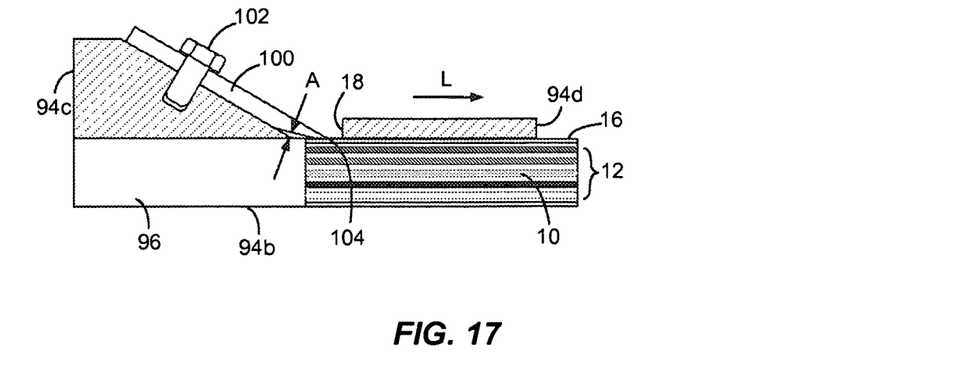

As shown in FIGS. 15 to 17, the tool block 94 is inclined downwardly from the top of the end wall 94c, to a point about halfway along the length of the block 94 at which a narrow rectangular slot 98 is formed transversely of the block to open into the guide slot 96. A tool blade 100 is fixed on the inclined portion of the block 94 by a bolt 102 or an equivalent fastener. The blade 100 has an edge 104 that projects through the narrow slot 98 and into an upper region of the recessed guide slot 96 in the bottom of the block 94. The blade edge 104 defines an angle A with respect to the horizontal so that when the tool block 94 slides over the bundle 10 in the direction S in FIG. 17, the blade edge 104 removes a narrow strip of the encasement or other covering layer without cutting into or harming the bundle fibers 12. The blade edge 104 may also form an angle that is not perpendicular to the direction of movement S in order to obtain an optimal cutting action for a particular encasement or outer cover on the bundle.

According to the inventive process, a narrow fiber bundle 10 is installed along a wall or other accessible surface in a common hallway or passage in a MDU by the use of an adhesive caulking and/or an activatable adhesive component that is coated on the bundle. Tools that enable a designated fiber to be withdrawn from the bundle midspan, either before or after the bundle is installed, are also disclosed herein. Further, the finished installation can acquire a more pleasing visual appearance compared to prior hallway bundle installations.

In particular, the inventive process has the following desirable features:

1. The size of the fiber bundle 10 is significantly less than current bundles, and the use of bend insensitive fibers like EZ-Bend® allows the bundle 10 to conform to corner bends with a radius as small as 3 mm. This allows a finished hallway installation to acquire a more pleasing visual appearance.

2. The fiber bundle 10 can be installed along a hallway wall in substantially less time than ducts that have an adhesive backing with a protective strip that must be peeled away and disposed of while the installation is taking place.

3. The tools 92 and 100 enable the bundle fibers 12 to be accessed quickly and safely midspan for each premises served by one or more of the fibers, allowing a designated fiber to be removed from the bundle and retained for connection with a drop fiber from the corresponding premises.

4. Lower overall cost for material and installation time.

While the foregoing represents preferred embodiments of the invention, it will be understood by persons skilled in the art that various changes, modifications, and additions can be made without departing from the spirit and scope of the present invention.

For example, the fibers 12 of the bundle 10 may be contained loosely inside a protective, narrow diameter outer jacket, instead of being bound within an inner acrylate matrix. Such would enable a "pullback" procedure, described above, to be used to cut a designated fiber and remove a desired length of the fiber from the bundle without having to open the outer jacket continuously over the same length.

Accordingly, the invention includes all such changes, modifications, and additions that lie within the scope and bounds of the following claims.

We claim:

1. A method of providing fiber optic network service to a number of dwelling units or premises each of which is adjacent to a hallway in a multi-dwelling unit (MDU) building, comprising the steps of:
    forming an optical fiber bundle including a number of bend insensitive optical fibers and an outer jacket for containing the optical fibers, wherein each one of the optical fibers is designated for a corresponding dwelling unit or premises adjacent to a hallway in a MDU building;
    installing the optical fiber bundle along a wall or other supporting surface and past each of the dwelling units or premises in the hallway, by adhering the fiber bundle to the wall or other supporting surface;
    during the installing step, forming a slack coil of the optical fiber bundle near an entry point of each dwelling unit or premises, and retaining the slack coil of the fiber bundle near the entry point;
    mounting a storage box on the wall or other supporting surface near the entry point of each dwelling unit or premises, and placing the slack coil of the optical fiber bundle retained near the entry point inside the storage box when mounted;
    for a given dwelling unit or premises, opening the outer jacket on the slack coil of the optical fiber bundle retained near the entry point of the given dwelling unit or premises, thereby exposing the optical fibers of the bundle;
    identifying an optical fiber designated for the given dwelling unit or premises from among the exposed optical fibers in the slack coil of the optical fiber bundle; and
    withdrawing an end length of the designated optical fiber from the slack coil of the optical fiber bundle, and storing the end length of the designated optical fiber in the storage box mounted near the entry point of the given dwelling unit or premises for connection to a drop fiber for the given dwelling unit or premises.

2. The method of claim 1, further including connecting the drop fiber for the given dwelling unit or premises to the end length of the designated fiber in the storage box.

3. The method of claim 1, further including forming the optical fiber bundle by binding the number of bend insensitive optical fibers within a matrix material.

4. The method of claim 1, further including terminating the end length of the designated fiber stored in the storage box mounted near the entry point of the given dwelling unit or premises, in an optical connector.

5. The method of claim 1, further including providing a connector adapter in the storage box mounted near the entry point of the given dwelling unit or premises, for connection to a mating connector on the drop fiber for the given dwelling unit or premises.

6. The method of claim 1, further including splicing the end length of the designated fiber stored in the storage box mounted near the entry point of the given dwelling unit or premises, to the drop fiber for the given dwelling unit or premises.

7. The method of claim 1, further including forming the optical fiber bundle by containing the number of bend insensitive optical fibers loosely within the outer jacket.

8. The method of claim 7, further including forming the fiber bundle to include an aramid or polyester yarn.

9. The method of claim 1, further including forming each of the bend insensitive optical fibers contained in the outer jacket of the optical fiber bundle to have an outer diameter (OD) of approximately 250 microns.

* * * * *